United States Patent [19]

Guerard

[11] Patent Number: 4,649,591
[45] Date of Patent: Mar. 17, 1987

[54] CONNECTOR FOR WIPER BLADES

[75] Inventor: Norbert Guerard, Virton, Belgium

[73] Assignee: Champion Spark Plug Europe S.A., Diegem, Belgium

[21] Appl. No.: 803,637

[22] Filed: Dec. 2, 1985

[30] Foreign Application Priority Data

Dec. 18, 1984 [FR] France ................................ 84 19346

[51] Int. Cl.$^4$ .............................................. B60S 1/40
[52] U.S. Cl. ................................................. 15/250.32
[58] Field of Search ........................ 15/250.32–250.42

[56] References Cited

U.S. PATENT DOCUMENTS

| 3,922,749 | 12/1975 | Castleman, Jr. et al. | 15/250.32 |
| 4,118,825 | 10/1978 | Hoebrechts et al. | 15/250.32 |
| 4,324,019 | 4/1982 | Mohnach et al. | 15/250.32 |

FOREIGN PATENT DOCUMENTS

| 0053960 | 11/1981 | European Pat. Off. | |
| 2361253 | 10/1976 | France . | |
| 2533517 | 11/1982 | France . | |
| 2531920 | 8/1983 | France . | |
| 2044082 | 10/1980 | United Kingdom | 15/250.32 |
| 2067068 | 3/1984 | United Kingdom . | |

Primary Examiner—Peter Feldman
Attorney, Agent, or Firm—Wood, Dalton, Phillips, Mason & Rowe

[57] ABSTRACT

A connecting device is provided for selectively connecting one of at least two different type wiper arm ends to a wiper blade having a rectangular opening in an upper portion of the blade. The wiper blade has laterally spaced side walls defining the rectangular opening with two pairs of aligned openings in said side walls. The diameter of one pair of aligned openings being different from the diameter of the other pair of aligned openings to receive recessed end portions of two different diameter pins. The connecting device seats in the rectangular opening and has latching means engaging with the recessed end portion of the selected one of the pins fitted in the pair of aligned openings in the side wall to retain the pin latched to the wiper blade. The connecting device has projections engaging with the edge of the rectangular opening in the blade or with a third pin on the blade for retaining the connecting device on the blade.

9 Claims, 10 Drawing Figures

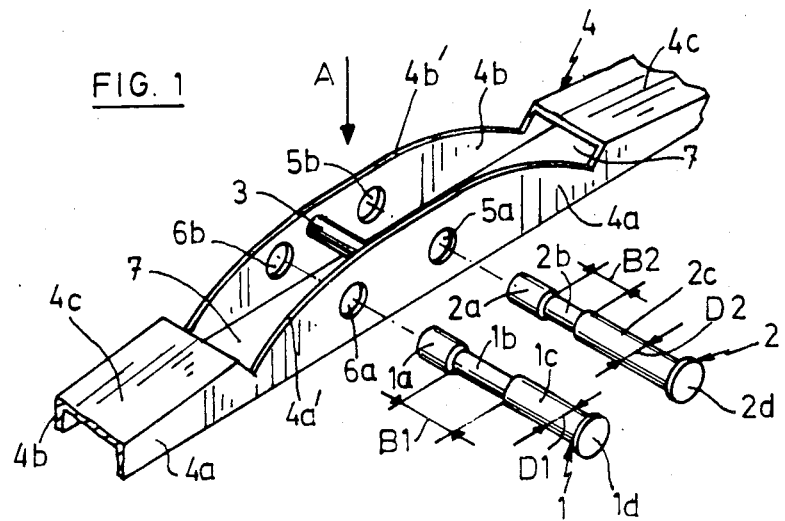
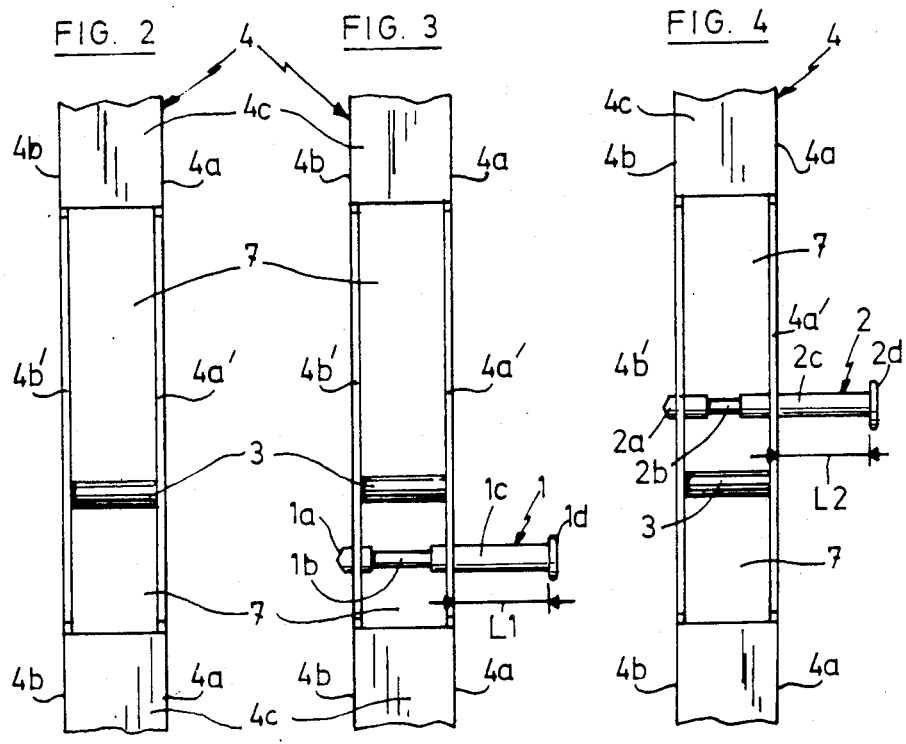

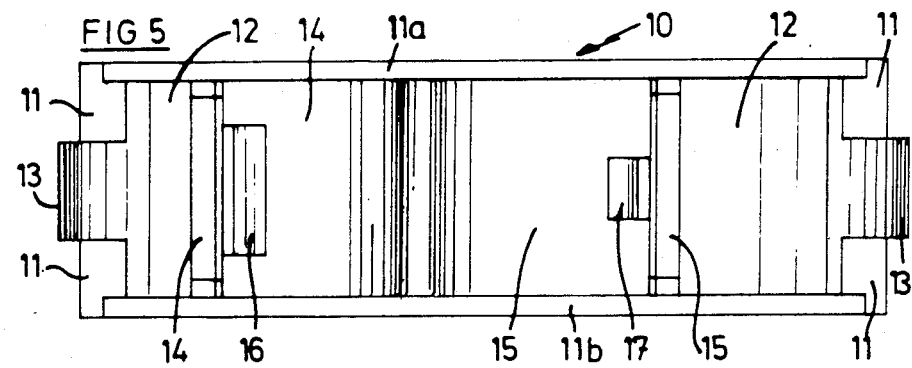
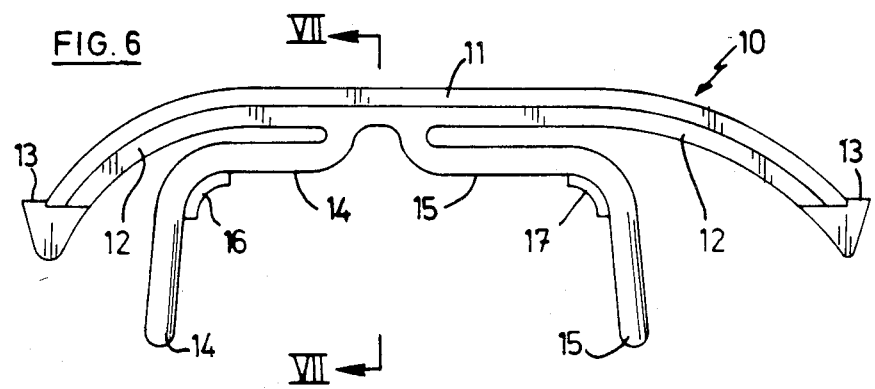
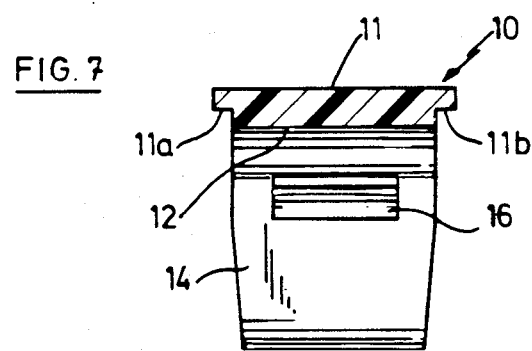

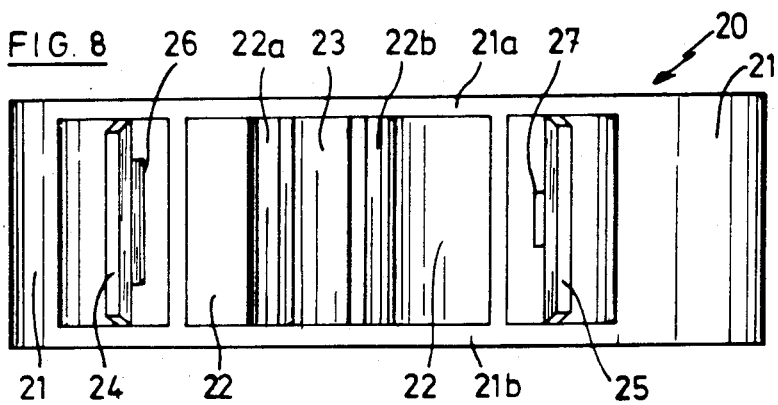
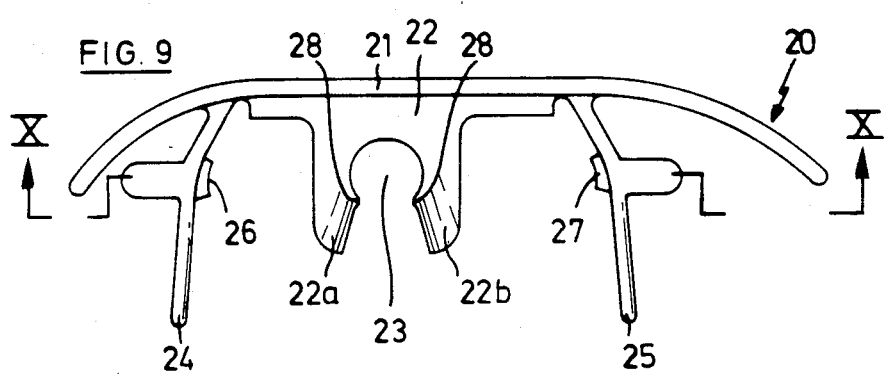
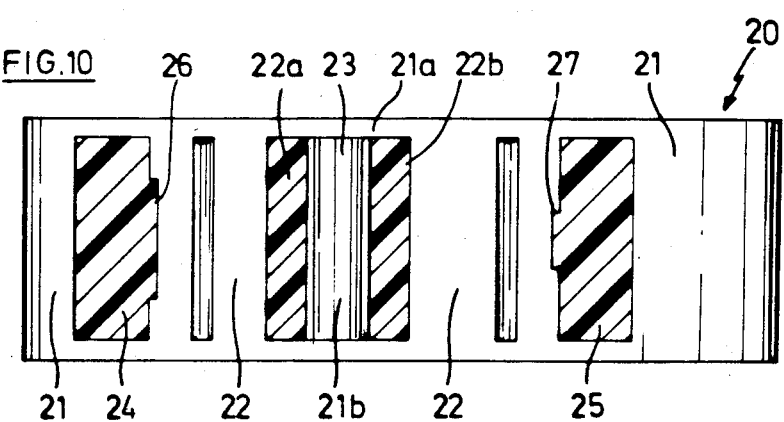

CONNECTOR FOR WIPER BLADES

FIELD OF THE INVENTION

The present invention relates to a connecting device for selectively connecting a wiper blade to a first and to a second wiper arm, wherein the superstructure of the wiper blade comprises a substantially rectangular opening which is laterally limited by two walls.

BACKGROUND OF THE INVENTION

Connecting devices (or connectors) for selectively connecting a wiper blade to several wiper arms are well known in prior art. For example, French patent application No. 2,533,517 discloses a connector to which several arms of different types can be attached, such as straight end arms, hook end arms and an arm provided with a lateral pivot pin. It is to be noted that the straight end and the hook end arms extend above the superstructure of the wiper blade, whereas the arm provided with a lateral pivot pin extends laterally with respect to the superstructure of the wiper blade.

The present invention only concerns the wiper arms provided with a lateral pivot pin, it being understood that the way the pivot pin is secured to the wiper arm is indifferent. In other words, the pivot pin may either be an integral part of the wiper arm or it may be removably attached to the wiper arm.

SUMMARY OF THE INVENTION

The object of the invention is to provide a connecting device or connector which makes it possible to selectively connect a wiper blade to two wiper arms provided with lateral pivot pins of different dimensions. To the best knowledge of the applicant, such a connector is not known in the prior art and thus the idea in itself, independently of the actual realization, is already new and inventive.

In view of the above defined object of the invention, the connecting device according to the invention is substantially characterized by the fact that:

a. the two wiper arms are respectively provided with a first pivot pin having given dimensions and with a second pivot pin having other dimensions, b. said lateral walls of the superstructure of the wiper blade are respectively provided with a first circular opening of which the diameter is slightly larger than the diameter of the first pivot pin and with a second circular opening of which the diameter is slightly larger than the diameter of the second pivot pin, the circular openings which respectively corresponds to the first and to the second pivot pin being in alignment, and c. the connecting device and the two pivot pins are provided with corresponding latching means capable of locking one or the other of said pivot pins on the superstructure of the wiper blade.

DESCRIPTION OF THE DRAWINGS

Other characteristics of the invention will be better understood when reading the following description of two embodiments of the invention in conjunction with the accompanying drawings wherein:

FIG. 1 is a perspective view of a portion of the superstructure of a wiper blade according to the invention and of two pivot pins of two wiper arms, FIG. 2 is a top view of the superstructure shown in FIG. 1, FIG. 3 is a top view of the superstructure shown in FIG. 1, wherein the first pivot pin has been inserted into the first circular openings in the lateral walls of the superstructure, FIG. 4 is a top view of the superstructure shown in FIG. 1, wherein the second pivot pin has been inserted into the second circular openings in the lateral walls of the superstructure, FIG. 5 is a bottom view of the connecting device of FIG. 6, FIG. 6 is an elevational view according to the first embodiment of the invention, FIG. 7 is a section view along line VII—VII of the connecting device of FIG. 6, FIG. 8 is a bottom view of the connecting device of FIG. 9, FIG. 9 is an elevational view according to the second embodiment of the invention, FIG. 10 is a sectional view along line X—X of the connecting device of FIG. 9.

DETAILED DESCRIPTION OF THE PREFERRED EMBODIMENT

The portion of the superstructure 4 of a wiper blade represented in FIG. 1 shows that said superstructure 4 has substantially the form of an inverted U with two lateral walls 4a, 4b and a web 4c. In the area where the two pivot pins 1, 2 of the wiper arms (not shown) will be selectively attached to the superstructure 4, the web 4c of the superstructure is provided with a substantially rectangular opening 7 which is laterally limited by the walls 4a, 4b. A third pivot pin (or rivet) 3 extends between the lateral walls 4a, 4b in the area of the rectangular opening 7.

The thus described portion of the superstructure 4 is in fact a conventional structure which is largely used in prior art and which, for example, allows to attach thereto either a straight end arm or a hook end arm in using an appropriate connecting device or connector.

The two pivot pins 1, 2 of FIG. 1 have respectively a diameter D1, D2 so that D1>D2. Each of the pins 1, 2 are provided with an enlarged head portion 1d, 2d which retains the pin on the wiper arm by means known in prior art. This enlarged head portion is in fact not indispensable if said pins 1, 2 are an integral part of the corresponding wiper arms.

The body of the first pivot pin 1 is formed by the portions 1a, 1c and the body of the second pivot pin 2 is formed by the portions 2a, 2c. Each pin is moreover provided with an annular recess 1b, 2b of which the respective widths B1, B2 are so that B1>B2. Said recesses 1b, 2b are the latching means for locking the pins 1, 2 on the superstructure 4 via the connecting device 10, 20 (FIGS. 6 and 9) according to the invention.

For inserting therein one or the other of the pivot pins 1, 2 the lateral walls 4a, 4b of the superstructure 4 have been provided with the circular openings 6a, 6b and 5a, 5b which, respectively, are in alignment and of which the diameters are respectively slightly larger than the diameters D1 and D2 of the pivot pins 1, 2.

When assembling one or the other wiper arm with the superstructure 4, one or the other of the pivot pins 1, 2 (which are attached in a known manner to the appropriate wiper arm) is inserted into the corresponding circular openings, i.e. the pin 1 is inserted into the openings 6a, 6b (FIG. 3) or the pin 2 is inserted into the openings 5a, 5b (FIG. 4).

It is to be noted that in FIGS. 1 to 4 the properly so called connector, i.e. the device shown in FIGS. 5 to 7 and 8 to 10, is not represented and that in FIGS. 3 and 4 the references L1 and L2 respectively indicate the approximate width of the first and of the second wiper arm, width which is of course not necessarily the same in the two cases.

FIGS. 5, 6 and 7 show the first embodiment of the connecting device (10) according to the invention. It comprises an upper portion 11 which, in a top view, has a substantially rectangular shape of which the dimensions substantially correspond to the dimensions of said rectangular opening 7 of the superstructure 4 of the wiper blade, except for its width which is equal to the total width of the superstructure 4 in the area of the rectangular opening 7.

Besides said upper portion 11, the connecting device (10) according to the first embodiment of the invention comprises a lower portion 12, 14, 15 of which the length and the width are slightly smaller than the length and width of the rectangular opening 7 of the superstructure 4 of the wiper blade. Said lower portion 12, 14, 15 can thus be completely inserted into said rectangular opening 7.

When said lower portion 12, 14, 15 is inserted from above into the rectangular opening 7, the lateral edges 11a, 11b of the upper portion 11 rest respectively on the upper edges 4a', 4b' of the lateral walls 4a, 4b of the rectangular opening 7, rectangular opening 7 which is then completely covered by said upper portion 11 of the connecting device 10.

The connecting device 10 is attached to the superstructure 4 of the wiper blade by a snap-on system comprising, at each extremity if the device, a projection 13 capable of snapping beneath the web 4c of the superstructure when slightly pressed down.

The lower portion 12, 14, 15 of the connecting device 10 comprises two flexible tongues 14, 15 which can be actuated manually from below when the device is mounted on the superstructure 4. Each tongue 14, 15 is provided with a projection 16, 17 of which the width respectively corresponds to the width B1 of the annular recess 1b of the first pivot pin 1 and the width B2 of the annular recess 2b of the second pivot pin 2.

The mounting of a wiper arm, i.e. of one of the pivot pins (for example the pin 1) onto the superstructure 4 of the wiper blade is executed as follows:

the pin 1 is inserted into the circular openings 6a, 6b (FIGS. 1 and 3), the connecting device 10 is inserted from above (arrow "A", FIG. 1) into the rectangular opening 7 until the lateral edges 11a, 11b of its upper portion 11 rest on the upper edges 4a', 4b' of the lateral walls 4a, 4b of the rectangular opening 7, the snap on means, i.e. the projections 13, are pushed beneath the web 4c of the superstructure 4 of the wiper blade.

The connecting device 10 is now firmly attached to the superstructure 4 and the pivot pin 1 is locked in said same superstructure 4 because the projection 16 of the flexible tongue 14 has snapped into the annular recess 1b of the pin 1. The pin 1 is locked laterally but it still can rotate about its axis or, in other words, the wiper blade can rotate with respect to the corresponding wiper arms.

FIGS. 8, 9 and 10 show the second embodiment of the connecting device (20) according to the invention. This embodiment also comprises an upper portion 21 which, in a top view, has a substantially rectangular shape of which the dimensions substantially correspond to the dimensions of said rectangular opening 7 of the superstructure 4 of the wiper blade, except for its width which is equal to the total width of the superstructure 4 in the area of the rectangular opening 7.

Besides said upper portion 21, the connecting device (20) according to the second embodiment of the invention also comprises a lower portion 22, 24, 25 of which the length and the width are slightly smaller than the length and the width of the rectangular opening 7 of the superstructure 4 of the wiper blade. Said lower portion 22, 24, 25 can thus be completely inserted into said rectangular opening 7.

When said lower portion 22, 24, 25 is inserted from above into the rectangular opening 7, the lateral edges 21a, 21b of the upper portion 21 rest respectively on the upper edges 4a', 4b' of the lateral walls 4a, 4b of the rectangular opening 7 which is then completely covered by said upper portion 21 of the connecting device 20.

The connecting device 20 is attached to the superstructure 4 of the wiper blade by a snap-on system capable of snapping onto the third pivot pin (or rivet) 3 of the superstructure 4 of the wiper blade. The snap-on system comprises, as well known in prior art, two slightly flexible tongues 22a, 22b which form a seat 23 for the pin 3 of the wiper blade. The seat 23 is provided at its lower portion with two projections 28 which prevent the pin 3 from falling out of the seat.

The lower portion 22, 24, 25 of the connecting device 20 comprises two flexible tongues 24, 25 which can be actuated manually from below when the device is mounting on the superstructure 4. Each tongue 24, 25 is provided with a projection 26, 27 of which the width respectively corresponds to the width B1 of the annular recess 1b of the first pivot pin 1 and the width B2 of the annular recess 2b of the second pivot pin 2.

The mounting of a wiper arm, i.e. of one of the pivot pins (for example the pin 2) onto the superstructure 4 of the wiper blade is executed as follows:

the pin 2 is inserted into the circular openings 5a, 5b (FIGS. 1 and 4), the connecting device 20 is inserted from above (arrow "A", FIG. 1) into the rectangular opening 7 until the pin 3 of the superstructure 4 is located in its seat 23. The lateral edges 21a, 21b of the connecting device 20 now rest on the upper edges 4a', 4b' of the lateral walls 4a, 4b of the rectangular opening 7.

The connecting device 20 is now firmly attached to the superstructure 4 and the pivot pin 2 is locked in said same superstructure 4 because the projection 27 of the flexible tongue 25 has snapped into the annular recess 2b of the pin 2. Just as explained above for pin 1 (first embodiment) the pin 2 is locked laterally but it still can rotate about its axis or, in other words, the wiper blade can rotate with respect to the corresponding wiper arm.

Two embodiments of the invention have thus been described. It is however evident that the invention is not limited to these two embodiments and that modifications can be made without departing from the scope of the invention such as defined in the appended claims.

I claim:

1. A connecting device (10, 20) for selectively connecting a wiper blade to a first and to a second wiper arm, wherein the superstructure (4) of the wiper blade comprises a substantially rectangular opening (7) laterally limited by two walls (4a, 4b), characterized in that:

a. the two wiper arms are respectively provided with a first pivot pin (1) having given dimensions and with a second pivot pin (2) having other dimensions,
b. said lateral walls (4a, 4b) are respectively provided with a first circular opening (6a, 6b) of which the diameter is slightly larger than the diameter (D1) of the first pivot pin (1) and with a second circular opening (5a, 5b) of which the diameter is slightly larger than the diameter (D2) of the second pivot pin (2), the circular openings (6a, 6b; 5a, 5b) which respectively correspond to the first and to the second pivot pin (1, 2) being in alignment, and
c. the connecting device (10, 20) and the two pivot pins (1, 2) are provided with corresponding latching means (16, 26, 1b; 17, 27, 2b), capable of locking one or the other of said pivot pins (1, 2) on the superstructure (4) of the wiper blade.

2. A connecting device (10) according to claim 1, characterized in that the connecting device is attached to the superstructure (4) of the wiper blade, in the area of said rectangular opening (7), by a snap-on system.

3. A connecting device (20) according to claim 1 wherein the superstructure (4) of the wiper blade is provided with a third pivot pin (3) located between said lateral walls (4a, 4b) in the area of said rectangular opening (7), characterized in that the connecting device (20) is attached to the third pivot pin (3) by means of a snap-on system (22a, 22b, 23, 28).

4. A connecting device (10, 20) according to claim 1, characterized in that the connecting device comprises an upper portion (11, 21) which completely covers said rectangular opening (7) and of which the lateral edges (11a, 11b; 21a, 21b) rest on the upper edges (4a', 4b') of the lateral walls (4a, 4b) of said rectangular opening (7).

5. A connecting device (10, 20) according to claim 4, characterized in that the connecting device comprises a lower portion (12, 14, 15; 22, 24, 25) which is located in the rectangular opening (7) provided in the superstructure (4) of the wiper blade.

6. A connecting device (10, 20) according to claim 1, characterized in that the latching means of the first and of the second pivot pin (1, 2) are annular recesses (1b, 2b) provided on each pin (1, 2).

7. A connecting device (10, 20) according to claim 6, characterized in that the width (B1) of the annular recess (1b) of the first pivot pin (1) is larger than the width (B2) of the annular recess (2b) of the second pivot pin (2).

8. A connecting device (10, 20) according to claim 1, characterized in that the latching means of the connecting device (10, 20) are two projections (16, 17; 26, 27) respectively provided on two flexible tongues (14, 15; 24, 25).

9. A connecting device (10, 20) according to claim 8, characterized in that the width of each of said projections (16, 17; 26, 27) is slightly smaller than the width (B1, B2) of the corresponding annular recess (1b, 2b) of the first and of the second pivot pin (1, 2).

* * * * *